Figure 1:
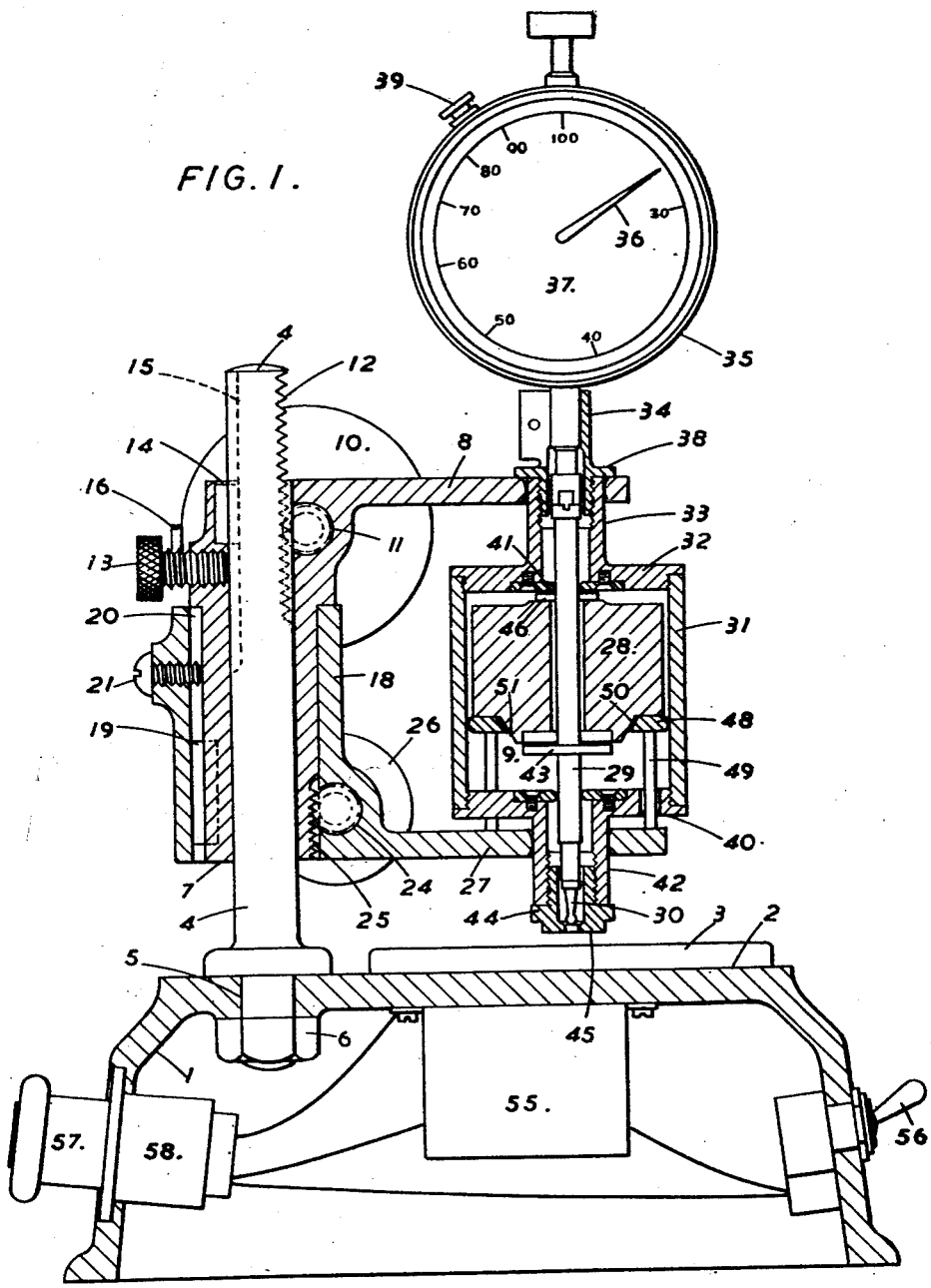

Inventor
ARTHUR ROWLATT MORE

June 30, 1953  A. R. MORE  2,643,545
APPARATUS FOR MEASURING THE HARDNESS OF MATERIALS
Filed June 22, 1949  2 Sheets-Sheet 2

Inventor
ARTHUR ROWLATT MORE

By Ernest J. Mechlin
Attorney

Patented June 30, 1953

2,643,545

UNITED STATES PATENT OFFICE 2,643,545

APPARATUS FOR MEASURING THE HARDNESS OF MATERIALS

Arthur Rowlatt More, Caterham, England, assignor to H. W. Wallace & Company Limited, Croyden, England, a body corporate of Great Britain Application June 22, 1949, Serial No. 100,626
In Great Britain June 22, 1948

2 Claims. (Cl. 73—83)

This invention relates to apparatus for measuring the hardness of materials by determining the resistance to indentation of the materials by means of a suitably shaped indentor which is pressed against the surface of the material, and the invention has more especial reference to apparatus for measuring the hardness of objects or specimens of rubber or other plastic or resilient substances which are easily deformable.

In the accepted British standard hardness test for rubber, the test-piece is supported on a horizontal rigid surface and the indenting plunger with a spherical end is pressed vertically on to the rubber with a given load of 30 grams, the position of the plunger being read by any suitable means, usually on a dial. An additional load of 535 grams is then applied to the plunger and maintained, the position of the plunger being again read and the movement of the plunger, that is the difference between the two readings expressed in appropriate units giving the hardness. During the loading periods the apparatus is gently vibrated preferably by means of a buzzer to overcome any frictional resistance to its moving parts.

These conditions permit two possible ways of making the standard test.

(A) By having a reference face which makes contact with the specimen's upper surface and by having the indentor emerge from a hole in this reference face so indenting the material. The measurement that is made is the distance from the reference face to the extremity of the indentor.

(B) The specimen is rested on a flat horizontal surface or platform, and the indentor is either lowered or the platform raised, so that the indentor makes contact with the top surface of the specimen. When the indentor is fully loaded it sinks into the material and its depth of indentation is measured with reference to the platform which supports the underside of the material.

There is at present no one apparatus available which can conveniently be used for both these methods of test and neither is there an apparatus for carrying out either of these tests which comprises one compact unit with no separate weights.

The present invention provides an improved self-contained, unitary form of apparatus without loose parts in which both tests may be readily and conveniently effected.

Broadly stated, apparatus for measuring the hardness of materials, such as specimens of rubber, according to the present invention essentially comprises a base providing an upper horizontal rigid datum surface for the specimens, a column upstanding from said base and serving as a guide for a carriage mounting the indenting member or plunger and with it means selectively applying the differential load to the plunger and the gauge for indicating its position, means being also provided for moving the carriage up and down the column to accommodate specimens of different thickness on the datum surface and successively to apply to the penetration member in contact with the specimen the differential loadings required to ascertain the hardness of the specimen.

Conveniently the column is formed with rack teeth and the carriage provides bearings for a pinion engaging such rack teeth, the pinion having a small hand wheel so that rotation of the hand wheel in the appropriate direction raises or lowers the carriage as required.

Preferably the carriage is in two parts movable relatively one to the other for the purpose of applying the additional load to the plunger when required during use to take the second reading for a test of the Type B aforementioned, the carriage being moved as a whole down the column to bring the penetration member into contact with the specimen and take the first reading whereafter the lower part is moved downwardly from the upper part of the carriage to apply the additional load to the plunger.

Figure 2:
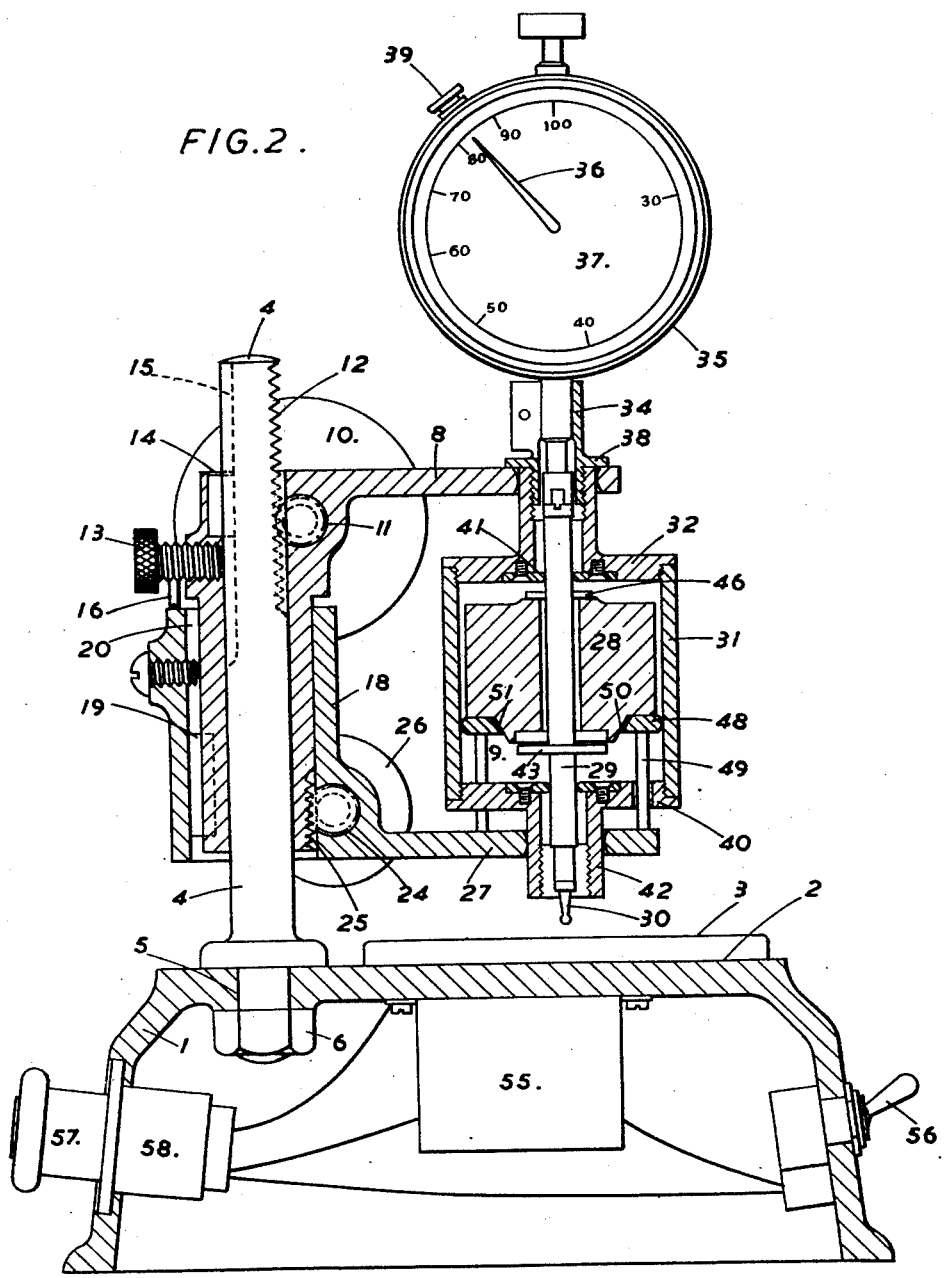

The invention will be further described with reference to the accompanying drawings which illustrate by way of example a specific embodiment of the apparatus and in which Fig. 1 is a vertical section showing the apparatus set for making a hardness test of the Type A, while Fig. 2 is a similar section of the apparatus set for making a test for the Type B previously mentioned.

Referring now to the drawings, the base 1 is a hollow casting of rectangular shape in plan having a flat elevated upper surface 2 carrying a glass plate 3 providing a horizontal rigid datum upon which the specimens to be tested are adapted to rest.

4 is a column of circular section having at its lower end a screw-threaded shank 5 which passes through an aperture in the base and is secured to it by a nut 6. The carriage is in two portions of which the upper portion comprises a tube 7 sliding on the column 4 and having a horizontal arm 8 carrying the plunger assembly generally designated 9 as hereafter described.

To move the carriage a handwheel 10, which may be positioned at either side, has a pinion 11 engaging rack teeth 12 formed in the upper portion of the column, such tubular guide 7 also having in the embodiment shown a thumb screw 13 carrying a stop 16 for the purpose hereafter described.

To fix the angular disposition of the horizontal arm 8 carrying the plunger assembly in relation to the column, a key 14 rides in a keyway 15 provided for the purpose in the upper portion of the column opposite the rack 12.

The lower component of the carriage has a sleeve 18 encircling the tubular guide 7 of the upper component and held against angular displacement in relation to the latter by a key 19 riding in a keyway 20 formed in the sleeve, the downward movement of which latter in relation to the tubular guide is limited by a set-screw 21 coming into abutment with the key while being movable in relation to the upper component for taking a second reading in a Type B test by means of a pinion 24 engaging rack teeth 25 formed on the external wall of the tubular guide 7, the pinion 24 having a small handwheel 26 for its convenient manipulation.

27 is a horizontal arm integral with and projecting from the sleeve 18, which arm forms a guide for the lower end of the plunger assembly 9 as well as an indirect support for all the moving contents of this plunger assembly except when contact is made with the specimen.

The plunger assembly comprises a plunger proper 29 terminating at its lower end in a penetration member 30 having a hemispherical surface and the additional weight 28 aforementioned which for a British standard hardness test is of 535 gms., and in the embodiment shown is of annular form surrounding the plunger 29. 31 is a cylindrical housing for the additional weight which housing has a coverplate 32 formed with an upstanding neck 33 by which the plunger assembly is carried from the horizontal arm 8 of the upper portion of the carriage.

Also mounted in the neck 33 of the coverplate 32 is the hollow depending spigot 34 of a gauge 35 which is of circular form and has an indicator needle 36 moving over a suitably calibrated dial 37.

The cylindrical housing 31 is also provided with a bottom cover 40 screwed in place as is the case with the top cover, both covers mounting antifriction guides indicated at 41 for centralizing the plunger during its vertical movement and the bottom cover having a tubular boss or bush 42 which slides freely through an aperture in the horizontal arm 27 of the lower portion of the carriage in the same way that the neck 33 slides in its aperture in the upper arm 8, the extent of this downward movement being limited by an annular flange 38 on the hollow spigot 34 which is screwed into it and which mounts the gauge.

The cylindrical housing of the plunger assembly together with its top and bottom covers is normally carried by this annular flange 38 resting on the top arm 8 of the carriage, whereas the remaining parts are directly or indirectly carried on the lower arm and the gauge mechanism is preferably magnetically coupled to the plunger 29 and is loaded so as to apply to the penetration member 30 a pressure of 30 gms. in the case of apparatus intended for carrying out the present day British standard hardness tests.

The bush 42 of the bottom cover 40 projects downwardly through the lower arm 27 of the carriage and has screwed into it a removable foot or ferrule 44 with a flat annular surface 45 surrounding the penetration member 30 when the upper surface of the specimen is to be used as the datum for a test as in method A. This ferrule 44 is removed for the Type B test when the lower surface of the specimen resting on the glass block or plate 3 is to be used as the datum.

The additional annular weight 28 is normally held clear of the plunger by a ring 48 within the housing 31 which has three rods or pillars 49 depending through apertures in the bottom cover 40 and resting on the lower arm 27 of the carriage. The weight supporting ring 48 slides in the cylindrical housing and has a coned surface 50 co-operating with a frusto-conical downward projection 51 on the bottom of the weight 28 to centralise it and hold it clear of the plunger in the normal condition.

Before using the instrument to effect a test of the Type A it should be checked to see that the ferrule or contact foot 44 is screwed finger tight and the small hand-wheel 26 should be turned until the lower arm 27 is raised as far as possible when it can be locked by a lock nut provided for the purpose on the handwheel.

To carry out the test, the carriage is raised by rotating the handwheel 10 sufficiently high to enable the specimen to be inserted between the contact foot 44 and the glass plate 3, the plunger 29 being held up by a pin 46 supported by the top of the additional weight 28.

The carriage should then be lowered as a whole by rotating the large handwheel 10 only, until the foot 44 makes contact with the specimen and the pointer 36 comes to rest in an upward direction.

The rim of the dial 37 should then be rotated until the 100 calibration coincides with the pointer 36 when the rim can be locked by the set screw 39 and the lowering of the carriage continued until the pointer comes to rest when it will indicate the hardness in British standard degrees.

When the carriage is lowered sufficiently, the weight of the casing will be transferred from the upper arm 8 to the specimen and on continued lowering of the carriage the additional weight 28 below which is a weight table or shoulder 43 on the plunger 29, is transferred from the lower arm 27 to such table and thus to the plunger.

From the preceding description it will be noted that by lowering the carriage in the manner suggested, three separate operations are accomplished in the following sequence:

(a) The contact foot or ferrule 44 makes contact with the specimen.

(b) The indentor or penetration number 30 with 30 gms. loading is applied to the specimen, and (c) The additional 535 gms. loading is added to the 30 gms. making a total pressure of 565 gms. applied to the specimen through the penetration member.

For a test of the Type B the contact foot 44 is removed as in Fig. 2 and the lower portion 18 of the carriage is dropped by turning the handwheel 26 whereafter the set screw 13 is positioned so that its stop 16 points downwardly and the lower portion 18 of the carriage is brought up against this stop 16 which sets the indicator 36 in a suitable position for zeroising.

The carriage is then lowered on to the specimen by rotating the large handwheel 10 until the pointer 36 coincides with the 100 graduation on the dial after which the lower portion 18 of the carriage is lowered independently by the small handwheel 26 until the pointer comes to rest indicating the hardness of the specimen.

The independent lowering movement of the bottom part 18 of the carriage applies the 535 gms. additional weight to the penetration member 30 through the table 43 and causes consequential movement of the pointer 36 according to the indentation of the specimen.

55 is a vibrator and 56 its actuating switch on the front of the base 1, the vibrator being fed from a suitable source of electric current supply such as the mains through a socket 57 on the rear wall of the base taking an appropriate lead plug 58.

For testing larger specimens of cylindrical or other form the carriage may be swung around with the column so that the plunger assembly is supported clear of the base.

By the present invention improved and convenient apparatus for measuring or testing the hardness of materials is obtained.

What I claim is:

1. Apparatus for measuring the hardness of materials comprising a base providing an upper horizontal rigid fixed datum surface for specimens, a guide column upstanding from said base, a carriage riding said guide column, a housing supported by said carriage and having a bottom, an indenting member, a plunger mounting said indenting member and exerting thereon a constant mass load, said plunger being guided for vertical movement in said housing, means for selectively adding a supplementary mass load to the indenting member including an annular weight freely encircling the plunger within said housing, a tapered downward projection on the underside of said annular weight, a complementarily tapered annular support upon which the annular weight normally rests, a platform abutment on said plunger, column means sustaining said annular support and passing downwardly through apertures in the bottom of the housing, and a member extending beneath said housing and supporting said column means, said member being mounted on the carriage and vertically movable in relation thereto for lowering the support and causing the weight to rest on said platform abutment to load the plunger.

2. Apparatus for measuring the hardness of materials comprising a base providing an upper horizontal rigid fixed datum surface for specimens, a guide column upstanding from said base, a carriage riding said guide column, a housing supported by said carriage and vertically movable in relation thereto, a hollow foot projecting downwardly from said housing and having a flat underface for contact with a specimen resting on the datum surface of the base, an indenting member, a plunger mounting said indenting member and exerting thereon a constant mass load, said plunger being guided for vertical movement in said housing and being mounted coaxially with and extending through said hollow foot, said foot being movable vertically with the housing for accommodating specimens of differing thicknesses and being subjected to a constant loading at all heights and with all relative positions of the plunger, means for selectively adding a supplementary mass load to the indenting member including an annular weight freely encircling the plunger within said housing, a support mounted on said carriage and upon which the annular weight normally rests, a platform abutment on said plunger, and means for lowering the support with the carriage to cause the weight to rest on said platform abutment to load the plunger.

ARTHUR ROWLATT MORE.

References Cited in the file of this patent

UNITED STATES PATENTS

| Number | Name | Date |
|---|---|---|
| 1,519,602 | Zimmerman et al. | Dec. 16, 1924 |
| 1,723,404 | Brown | Aug. 6, 1929 |
| 1,806,767 | Shore | Mar. 26, 1931 |
| 1,822,662 | Letsch | Sept. 8, 1931 |
| 1,870,415 | Lewis | Aug. 9, 1932 |
| 1,885,972 | Wilson | Nov. 1, 1932 |
| 2,053,472 | Gogan | Sept. 8, 1936 |
| 2,385,958 | Woxen | Oct. 2, 1945 |
| 2,533,279 | Moore et al. | Dec. 12, 1950 |